(12) United States Patent
Rütten et al.

(10) Patent No.: US 6,655,675 B2
(45) Date of Patent: Dec. 2, 2003

(54) X-RAY DETECTOR OFFERING AN IMPROVED LIGHT YIELD

(75) Inventors: Walter Rütten, Linnich/Ederen (DE); Matthias Simon, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 230 days.

(21) Appl. No.: 09/904,601

(22) Filed: Jul. 13, 2001

(65) Prior Publication Data

US 2002/0014592 A1 Feb. 7, 2002

(30) Foreign Application Priority Data

Jul. 14, 2000 (DE) .......................................... 100 34 575

(51) Int. Cl.⁷ ................................................. G01T 1/20
(52) U.S. Cl. .............. 270/368; 250/370.09; 250/370.11
(58) Field of Search ........................... 250/368, 370.08, 250/370.09, 370.11

(56) References Cited

U.S. PATENT DOCUMENTS

| 4,945,242 | A | * | 7/1990 | Berger et al. | ................ | 250/367 |
| 5,861,628 | A | * | 1/1999 | Genna et al. | ............... | 250/368 |
| 5,936,230 | A | | 8/1999 | Street | | |
| 5,973,327 | A | * | 10/1999 | Moy et al. | ............. | 250/370.09 |
| 6,369,391 | B1 | * | 4/2002 | Hefetz et al. | ................ | 250/368 |
| 6,512,231 | B1 | * | 1/2003 | Moy | .......................... | 250/368 |

* cited by examiner

*Primary Examiner*—Albert Gagliardi
(74) *Attorney, Agent, or Firm*—John Vodopia

(57) ABSTRACT

The invention relates to an X-ray detector for converting X-rays (27) into electric charges, including a scintillator arrangement (21) and a photosensor arrangement (28) which is situated therebelow; the light that is incident in openings Z between the pixels P is reflected to the photosensor D by means of a reflector arrangement (23) so that it contributes to an increased signal without degrading the spatial resolution of the X-ray detector.

20 Claims, 2 Drawing Sheets

X-RAY DETECTOR OFFERING AN IMPROVED LIGHT YIELD

FIELD OF THE INVENTION

The invention relates to an X-ray detector for converting X-rays into electric charges, including a photosensor arrangement and a scintillator arrangement that is situated on a first side of the photosensor arrangement.

BACKGROUND OF THE INVENTION

Dynamic X-ray detectors are used in the medical diagnostic field. They are considered to be universal detector components that can be employed in various application-specific X-ray apparatus. An important feature in this respect is the possibility of acquisition of X-ray images and X-ray image sequences with low doses. Therefore, the aim is to achieve an as high as possible signal-to-noise ratio for the X-ray detector.

X-ray quanta emitted by a radiation source are absorbed in contemporary X-ray detector technology by a scintillator arrangement (for example, CsI) which is arranged on a photosensor matrix consisting of thin-film electronics. The light arising in the scintillator arrangement is detected by a respective photosensor for each matrix cell (pixel). The photodiode does not occupy the entire surface area of the pixel. A part thereof is occupied by a thin-film transistor as well as by signal leads and control leads; moreover, openings of a width of approximately 10 μm exist between the pixels and leads for the purpose of insulation. Light going past the photodiodes via said openings does not contribute to the generation of signals. On the basis of the geometrical relationships this light can be estimated to be approximately 10% of the total amount of light applied in the direction of the photosensor arrangement by the scintillator layer. A coarse measurement has revealed a light loss of approximately 8% through the openings. This light penetrates the region underneath the photodiodes via a substrate plate. The uncontrolled scattering of light must be prevented in this region, because light that is detected in pixels that are situated far from its origin has an adverse effect on the resolution.

Underneath the substrate plate, being situated at the second side of the photosensor arrangement and being realized, for example as a glass plate, there are situated illumination means which emit light for the optical resetting of the pixels. This resetting light is also referred to as "backlight" or "reset light". Such reset light passes through the openings between the photodiodes from the direction of the second side of the photosensor arrangement, is reflected or scattered by the scintillator layer and is picked up by the photodiodes which are thus reset.

U.S. Pat. No. 5,936,230 describes a sensor array in which a phosphor converter converts incident X-rays into visible light which is converted into an electric charge by photosensors arranged underneath said phosphor converter. Reflector strips are arranged between the phosphor converter and the photosensors. The light reflected in the openings between the photosensors is thus reflected back to the phosphor converter so as to be reflected to the photocells. This results in an improved light detection. It has been found that the fitting of such reflection or reflector strips between the photosensors and the phosphor converter is a very intricate operation.

OBJECTS AND SUMMARY OF THE INVENTION

Therefore, it is an object of the invention to provide an X-ray detector arrangement in which the light entering the openings can be effectively retroreflected and which can be simply manufactured.

This object is achieved in accordance with the invention in that a reflector arrangement is situated on the second side of the photosensor arrangement that is remote from the first side.

The X-ray detector includes a scintillator arrangement which is situated over a photosensor arrangement. The photosensor arrangement has two opposed sides as usual. The scintillator arrangement is arranged on a first side of the photosensor arrangement and the reflector arrangement is situated on the second side of the photosensor arrangement which is remote from the first side.

In the normal case it is to be assumed that the X-rays are incident on the scintillator arrangement from above in the direction of the first side of the photosensor arrangement, that the photosensor arrangement which detects the electric charges is arranged therebelow, and that the reflector arrangement is arranged underneath the photosensor arrangement on the second side thereof.

The openings between the photosensors enable light portions generated by the scintillator arrangement to travel past the photosensor arrangement without being used. In order to make use of these light portions for signal generation, the X-ray detector includes a regular reflector arrangement which is provided on the second side, that is, underneath the photosensor arrangement.

In an attractive embodiment of the invention the reflector arrangement which is situated underneath the photosensor arrangement is transparent to light that is incident from below or from the direction of the second side of the photosensor arrangement. The reflector arrangement is realized in such a manner that it reflects the light emitted by the scintillator layer as well as possible. At the same time the reflector arrangement is sufficiently transparent to light which is incident on the reflector arrangement from the direction of the second side of the photosensor arrangement, thus allowing passage to the reset light which is incident from below.

The specific influencing of the reflectivity and transmissivity of the reflector arrangement is realized by appropriately choosing the layer thickness and the material, that is, its refractive index. The optical properties of such a reflector arrangement in the form of a thin layer are based on interference. The wave selectivity is increased in general by using a plurality of layers of different materials. Customary materials in this respect are high melting metal fluoride ($MgF_2$, $CaF_2$) and oxide ($Ta_2O_5$, $SiO_2$, $ZrO_2$). The layer thicknesses are of the order of magnitude of from the wavelength of light to a few micrometers. Large-area homogeneous layers can be readily formed. For use in a dynamic X-ray detector the optical properties should be adjusted as follows. The reflectivity should be as high as possible (>90°) in a large spectral range of from approximately 450 nm to approximately 600 nm. At the same time the layer of the reflector arrangement should be as transparent as possible to light of other wavelengths so as to allow passage to the reset light from, for example, reset light emitting diodes that are arranged underneath the photosensor arrangement. The first requirement, however, has priority because an as large as possible amount of light should be reflected by the reflector arrangement so as to increase the signal. Given losses can be tolerated in the transmission of the reset light from the reset light emitting diodes, because such reset light emitting diodes can be driven with adequate intensity.

In a further advantageous embodiment of the invention a reflector arrangement is advantageously arranged underneath a substrate supporting the X-ray detector, said substrate preferably being realized in the form of a glass layer. The substrate is then situated between the photosensor layer and the reflector arrangement. This offers the advantage that the reflector arrangement cannot exert any electrical effect whatsoever on the photosensor arrangement.

The reflector arrangement in a further embodiment of the invention is constructed as a dielectric layer. Dielectric layers constitute electrical insulators and there will be no additional capacitances which would occur, for example, in the case of metallic reflector arrangements.

From a technological point of view it is advantageous to provide the dielectric reflector arrangement on the lower side of the substrate plate. Unlike when the dielectric reflector arrangement is provided directly underneath the photosensor arrangement, the processes for providing the photodiodes and the necessary thin-layer electronic circuitry for reading out the detected charge carriers in that case need not be compatible with the process for depositing the dielectric reflector layer.

Because the light has to pass the glass plate of the substrate twice during retroreflection, the yield and notably the spatial resolution are less than when the dielectric reflector arrangement is arranged underneath the substrate plate.

A further advantageous possibility for retroreflection consists in providing the upper side of the glass plate of the substrate with a metal layer, for example of aluminium, having a retroreflectivity of at the most approximately 90%. The metallic reflection layer is then provided directly or directly underneath the photosensor layer. Partial reflection amounting to, for example, 80% can also be achieved by way of a correspondingly thin reflection layer. As a result, practically the full amount of light is retroreflected upwards in the openings between the photosensors, so that it becomes available for signal recovery; the 20% transmission, however, suffices to allow passage of an adequate amount of reset light that is incident from below for the resetting of the photosensors. This electrically conductive reflection layer influences the electrical properties of the pixel structure. It must be provided so as to be appropriately insulated from the photosensor layer.

A further advantageous alternative consists in retroreflection of the light by suitable reflecting structures. Light entering the photosensor arrangement via the opening can thus be returned in the direction of the first side of the photosensor arrangement. Suitable reflecting structures in this respect are on the one hand retroreflectors of an order of magnitude in the $\mu$m range and on the other hand cylindrical concave mirrors. Retroreflectors at a glass/air interface operate with total reflection and, therefore, do not require an additional coating. The geometrical structure of retroreflectors is such that they reflect incident light back in the direction of incidence. The reflecting structures may be provided on the upper side as well as on the lower side of the substrate. The focal plane of the micromirrors must be situated in the plane of passage of the light, so the upper side of the glass plate of the substrate, and these mirrors should be provided with a reflecting metal layer, for example aluminium, on their rear. Because the reflecting areas are provided underneath the openings between the photodiodes, the reset light can in this case no longer reach the upper side directly from below the glass plate. When the reset light emitting diodes are suitably arranged, however, an adequate amount of reset light will reach the photosensors in an indirect way, so that they can be reset. In order to implement this solution, the lower side of the glass plate should be worked and structured mechanically in the $\mu$m range.

It is also advantageous to add reflecting substances to the substrate plate so that it is not necessary to deposit additional reflecting layers. In this respect use can be made of combinations such as $TiO_2$, the reflectivity then being adjustable by way of an appropriate choice of the mixing ratio with the substrate material. This embodiment does not require insulation from the photosensor layer either.

In all proposed arrangements the light is directed back upwards in the direction of the scintillator arrangement. It is then reflected or scattered from the lower side of the scintillator layer, or again penetrates the CsI. Therein it is subject to the same propagation conditions as light produced by the absorption of an X-ray quantum, i.e. its lateral propagation is impeded by the columnar structure, and it reaches the photodiode, for example, after further reflections from a cover layer. The cover layer is transparent to the high-energy X-rays that are incident from above. The described arrangements thus enable the use of a larger portion of the light that was not used thus far for the signal recovery, that is, without degrading the spatial resolution of the X-ray detector.

It is an advantage of the invention that as a result of the proposed steps the light that thus far did not contribute to the signal can now be used for signal generation. The amount of light that is incident on the photodiodes can be increased by approximately 7% after deduction of losses that are due to scattering and incomplete reflection. The signal-to-noise ratio of the detector is thus increased by as much as 0.6 dB. This represents a crucial improvement notably with regard to the imaging while using low X-ray doses. The costs are not high, notably not when use is made of the proposed embodiment utilizing a dielectric layer on the upper side of the glass plate, because such a layer can be deposited by means of standard methods. Furthermore, the costs of absorbing filters used thus far can be reduced or even saved completely.

BRIEF DESCRIPTION OF THE DRAWINGS

Embodiments of the invention will be described in detail hereinafter with reference to the drawings, wherein.

DETAILED DESCRIPTION OF THE INVENTION

Figure 1:
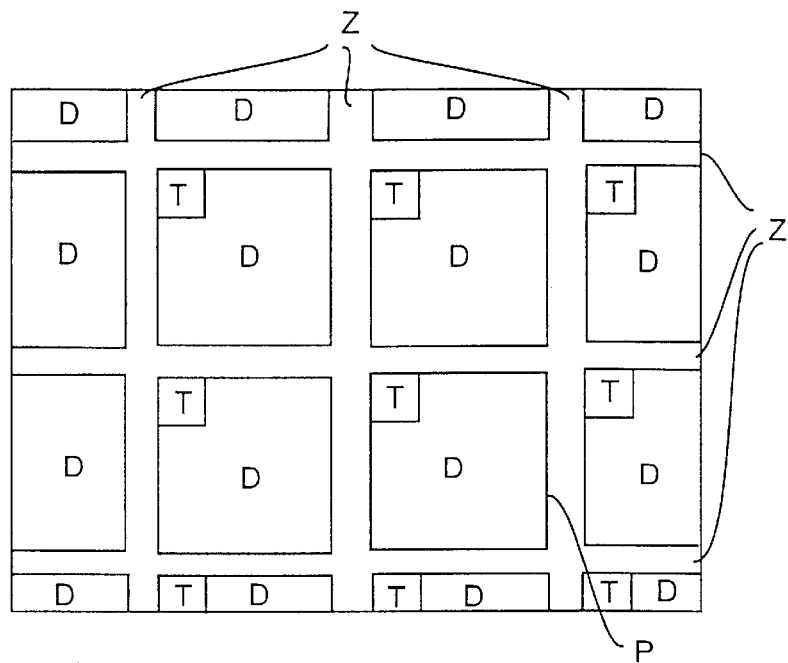
FIG. 1 is a plan view of a plurality of photosensors.

FIG. 1 shows a plurality of photodiodes D. Intermediate spaces Z are formed between the photodiodes D. The photodiode does not occupy the entire surface area of a pixel P. A part T is taken up by a thin-film transistor as well as by signal leads and control leads. The intermediate spaces Z serve for insulation between the individual pixels P and have a width of approximately 10 $\mu$m.

Figure 2:
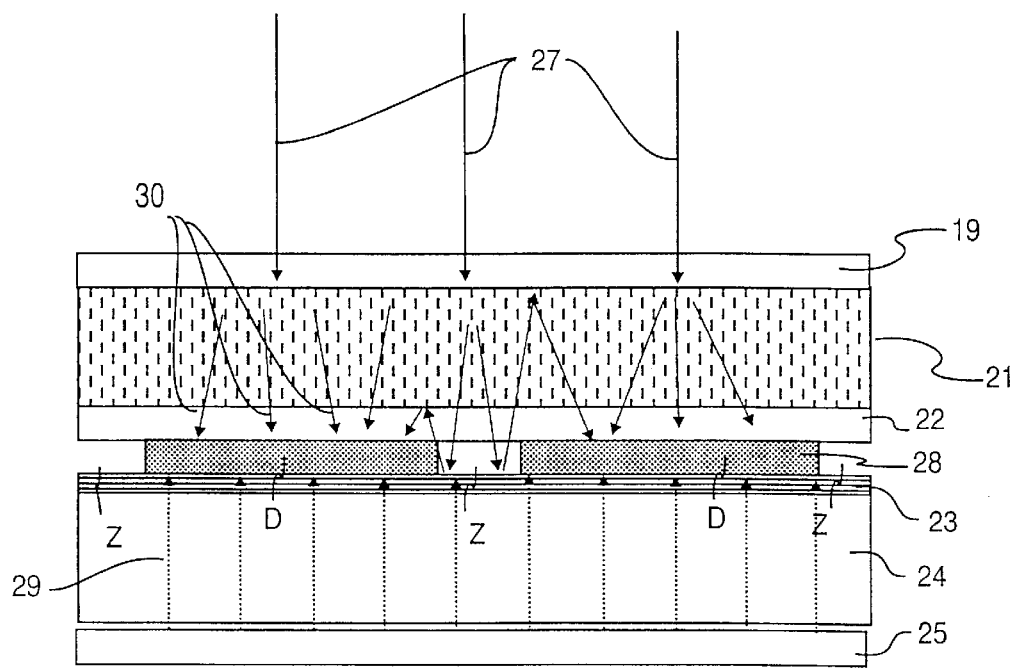
FIG. 2 is a sectional view of an X-ray detector with a reflector layer on the upper side of the glass plate.

FIG. 2 shows the construction of an X-ray detector in accordance with the invention which includes a scintillator arrangement 21 and a reflector arrangement 23 which is arranged underneath the photodiode layer 28. The X-rays 27 are incident on the scintillator arrangement 21. The X-rays 27 are converted into visible light 30 therein. Because of the columnar structure of the scintillator material, portions of the light are also reflected in the direction of the incident X-rays. A cover layer 19 which is provided above the scintillator arrangement 21 reflects such light portions in the direction of the photodiode layer 28. The light rays 30 traverse an intermediate layer 22 and are subsequently incident on the individual photodiodes D in the photodiode layer 28. The light rays 30 are incident not only on the photodiodes D but also in the intermediate spaces Z. The reflector arrangement 23 is situated underneath the photodiode layer 28. The light rays 30 having passed the intermediate spaces Z are reflected by said reflector arrangement 23 so as to be retroreflected by the cover layer 19, that is, at the transition from the scintillator arrangement 21 to the intermediate layer 22 or after the light rays 30 have penetrated the scintillator 21 again, so that they can reach the relevant photodiodes D so as to contribute to signal generation. A glass layer 24 is provided underneath the reflector arrangement 23. The glass layer 24 serves as a support or substrate for the X-ray detector. Underneath the glass layer 24 there is provided a reset arrangement 25. The reset arrangement 25 includes a plurality of light sources (not shown), for example light emitting diodes which emit light 29 in a spectral range that is suitable for resetting the photodiodes. The photodiodes D are reset by means of this light. The reflector arrangement 23 is transparent to the reset light 29.

Figure 3:
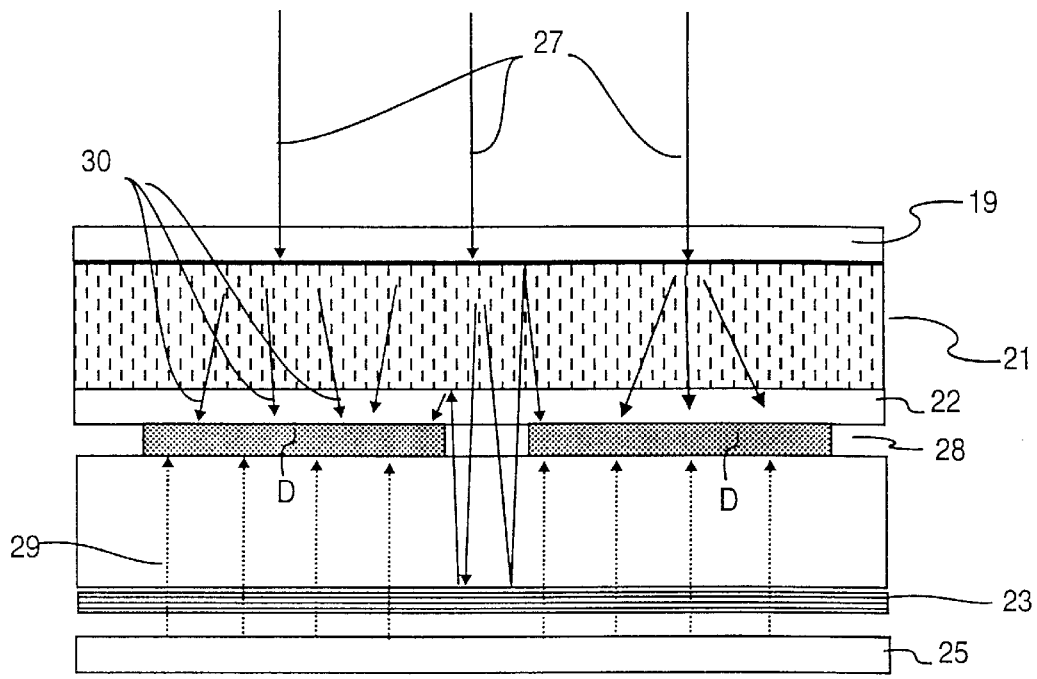
FIG. 3 shows an X-ray detector with a reflector layer on the lower side of the glass plate.

FIG. 3 shows an arrangement in accordance with the invention in which the reflector arrangement 23 is arranged underneath the glass plate 24. Light rays 30 which are incident in the intermediate spaces Z pass the glass layer 24 so as to be reflected by the reflector layer 23 provided on the lower side of the glass layer so that they pass the glass layer 24 again so as to be reflected at the transition between the intermediate layer 22 and the scintillator arrangement 21, or by the cover layer 19 above the scintillator 21, after which they are reflected to the relevant photodiode D so as to contribute to signal generation. The reflector arrangement 23 is again transparent to light that is incident on the reflector arrangement from below. It is transparent notably to light in the red spectral range which is emitted by the reset arrangement 25 that is arranged underneath the reflector layer so as to reset the photodiodes D.

Figure 4:
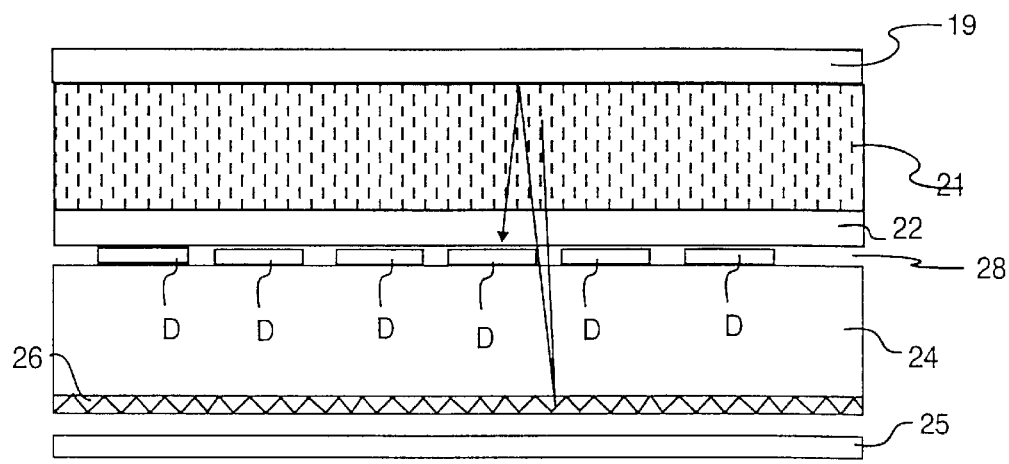
FIG. 4 shows an X-ray detector with retroreflectors.

FIG. 4 shows a further arrangement in accordance with the invention in which retroreflectors 26 are arranged underneath the glass layer 24; such retroreflectors 26 reflect the light rays 30 incident in the intermediate spaces in such a manner that the retroreflected light can contribute to the light yield in that it is reflected again by the intermediate layer or cover layer so that it reaches the photodiode.

What is claimed is:

1. An X-ray detector for converting X-rays into electric charges, comprising:
   a photosensor arrangement having photosensitive elements separated from one another such that spaces are formed between the photosensitive elements;
   a scintillator arrangement arranged on a first side of the photosensor arrangement,
   at least one additional layer arranged adjacent the scintillator arrangement to form a transition between the scintillator arrangement and the at least one additional layer enabling the reflection of light, and
   a retroreflector arrangement arranged on a second side of the photosensor arrangement opposite from the first side, whereby light passing through the spaces between the photosensitive elements is reflected by the reflector arrangement toward the scintillator arrangement and the at least one additional layer and then reflected at the transition between the scintillator arrangement and the at least one additional layer back toward the photosensitive elements.

2. An X-ray detector as claimed in claim 1, wherein the reflector arrangement is partially transparent to light incident on the reflector arrangement from the direction of the second side of the photosensor arrangement.

3. An X-ray detector as claimed in claim 1, further comprising a substrate arranged between the photosensor arrangement and the reflector arrangement for supporting the photosensor arrangement and the reflector arrangement.

4. An X-ray detector as claimed in claim 1, wherein the reflector arrangement is constructed so as to be dielectric.

5. An X-ray detector as claimed in claim 1, wherein the reflector arrangement is constructed so as to be metallic.

6. An X-ray detector as claimed in claim 1, wherein the reflector arrangement comprises retroreflectors arranged on the second side of the photosensor arrangement and having a geometrical structure to reflect incident light back in the direction of incidence.

7. An X-ray detector as claimed in claim 1, wherein the reflector arrangement is arranged to enable reflection of light incident from the direction of the first side of the photosensor arrangement and at the same time enables transmission of light of another wavelength from the direction of the second side of the photosensor arrangement.

8. An X-ray detector as claimed in claim 3, wherein the substrate contains reflecting substances.

9. An X-ray detector as claimed in claim 1, wherein the reflector arrangement comprises cylindrical concave mirrors.

10. An X-ray detector as claimed in claim 1, wherein the at least one additional layer includes a cover layer arranged above the scintillator arrangement in a direction away from the photosensor arrangement.

11. An X-ray detector as claimed in claim 10, wherein the cover layer is transparent to high-energy X-rays incident from above.

12. An X-ray detector as claimed in claim 10, wherein the at least one additional layer further includes an intermediate layer arranged between the scintillator arrangement and the photosensor arrangement.

13. An X-ray detector as claimed in claim 1, wherein the at least one additional layer includes an intermediate layer arranged between the scintillator arrangement and the photosensor arrangement.

14. An X-ray detector for converting X-rays into electric charges, comprising:
   a photosensor arrangement having photosensitive elements separated from one another such that spaces are formed between the photosensitive elements;
   a scintillator arrangement arranged on a first side of the photosensor arrangement,
   a substrate arranged underneath the photosensor arrangement for supporting the photosensor arrangement, and
   a retroreflector arrangement arranged on a second side of the photosensor arrangement opposite from the first side and underneath the substrate, the reflector arrangement having a reflectivity of at least 90° in a spectral range of from about 450 nm to about 600 nm,
   whereby light passing through the spaces between the photosensitive elements is reflected by the reflector arrangement toward the scintillator arrangement and then reflected back toward the photosensitive elements.

15. An X-ray detector as claimed in claim 14, wherein the reflector arrangement includes retroflectors having a geometrical structure to reflect incident light back in the direction of incidence.

16. An X-ray detector as claimed in claim 14, wherein the reflector arrangement includes cylindrical concave mirrors.

17. An X-ray detector for converting X-rays into electric charges, comprising:
  a photosensor arrangement having photosensitive elements separated from one another such that spaces are formed between the photosensitive elements;
  a scintillator arrangement arranged on a first side of the photosensor arrangement,
  a substrate arranged underneath the photosensor arrangement for supporting the photosensor arrangement,
  a retroreflector arrangement arranged on a second side of the photosensor arrangement opposite from the first side, the reflector arrangement comprising a metal layer arranged on an upper side of the substrate below the photosensitive elements and the spaces between the photosensitive elements, whereby light passing through the spaces between the photosensitive elements is reflected by the reflector arrangement toward the scintillator arrangement and then reflected back toward the photosensitive elements, and
  a reset arrangement arranged below the substrate for resetting the photosensitive elements,
  the metal layer having a reflectivity of not more than about 90% to enable reset light from the reset arrangement to pass through the metal layer to reset the photosensitive elements.

18. An X-ray detector as claimed in claim 17, wherein the metal layer has a reflectivity of not more than about 80%.

19. An X-ray detector for converting X-rays into electric charges, comprising:
  a photosensor arrangement having photosensitive elements separated from one another such that spaces are formed between the photosensitive elements;
  a scintillator arrangement arranged on a first side of the photosensor arrangement,
  a substrate arranged underneath the photosensor arrangement for supporting the photosensor arrangement, and
  a reflector arrangement arranged on a second side of the photosensor arrangement opposite from the first side,
  the reflector arrangement comprising retroreflectors having a geometrical structure to reflect incident light back in the direction of incidence or cylindrical concave mirrors.

20. An X-ray detector as claimed in claim 19, wherein the retroflectors or the concave mirrors are arranged on the substrate.

* * * * *